K. E. PEILER.
GLASS FEEDING MACHINE AND PROCESS.
APPLICATION FILED DEC. 30, 1916. RENEWED JAN. 2, 1920.
1,349,551. Patented Aug. 10, 1920.
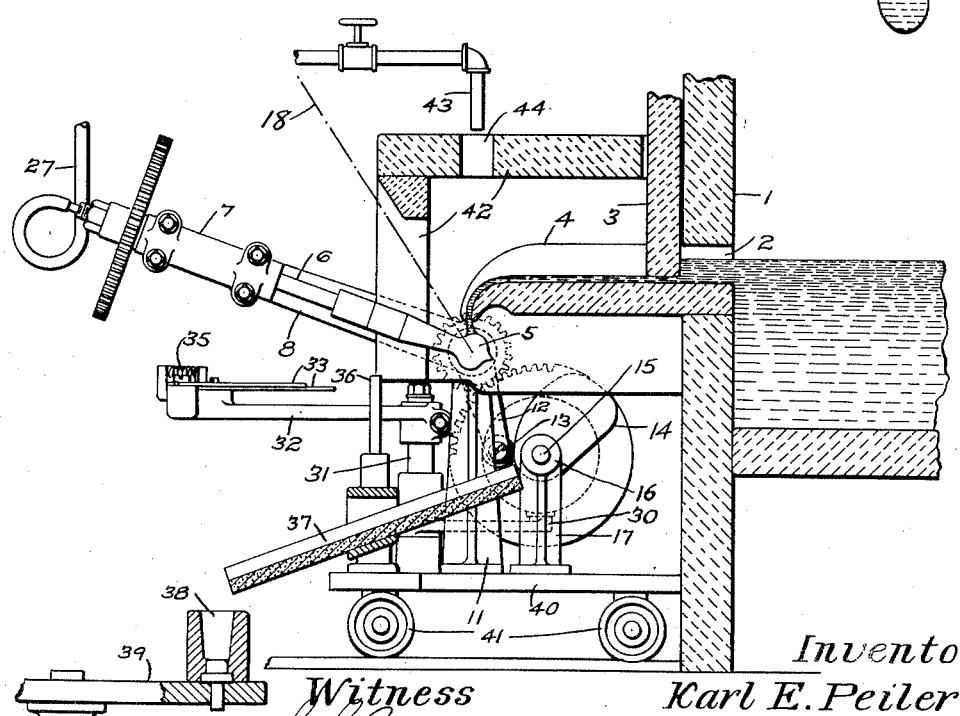
Witness
S. S. Grotta
Inventor
Karl E. Peiler
by W. H. Honiss
Atty

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

GLASS-FEEDING MACHINE AND PROCESS.

1,349,551.     Specification of Letters Patent.     Patented Aug. 10, 1920.

Application filed December 30, 1916, Serial No. 139,768. Renewed January 2, 1920. Serial No. 349,094.

*To all whom it may concern:*

Be it known that I, KARL E. PEILER, a citizen of the United States, residing at Hartford, in the county of Hartford and State of Connecticut, have invented new and useful Improvements in Glass - Feeding Machines and Processes, of which the following is a specification.

This invention relates to the art of feeding molten glass in separated masses or gathers in good form and condition for subsequent manipulation.

The object of the invention is to provide an efficient, simple and durable mechanism which will during predetermined intervals of time collect and shed uniform masses of the molten glass for subsequent shaping by molds, or by other means.

A rotatable gathering head is disposed beneath the discharge end of the fore-hearth or outlet of a furnace for collecting the desired masses of outflowing glass, and is periodically tilted to cause the masses to form in drops or gathers that may be readily severed and conducted away for further manipulation.

Figure 1 of the accompanying drawings is a plan view of one form of apparatus which embodies the invention. Fig. 2 is a side elevation of the apparatus, with a portion of the walls of the furnace and the fore-hearth shown in section. Fig. 3 is a view illustrating the distribution of the molten glass about the head as it flows from the fore-hearth. Fig. 4 is a view illustrating the sagging or shedding of the mass of glass after the head has been tilted. Fig. 5 shows the gather of glass depending from the head just before it is severed.

In the drawings the front wall 1 of the glass furnace or melting pot or other molten glass container is shown provided with an outlet opening 2, the area or discharging capacity of which is controlled by the vertically movable gate 3. Extending outwardly from the front wall of the furnace adjacent to the outlet is the fore-hearth 4. The glass in the furnace is melted to the desired state of viscosity and flows slowly through the outlet and discharges downwardly at the outer end of the fore-hearth.

An acorn-shaped or turnip-shaped gathering head 5 of refractory material is secured on the end of a shaft 6 below the discharge end of the fore-hearth. This shaft is supported in suitable bearings 7 on the end of a swinging bracket 8 which is pivotally hung on a shaft 9 that is supported by bearings 10 at the upper ends of standards 11. Extending downwardly from the pivoted end of the bracket is a cam arm 12 with a roll 13 that bears against the periphery of the cam 14 on the shaft 15 which is supported by bearings 16 at the upper ends of standards 17. The center of the gathering head is located approximately on the axis of the shaft 9 upon which the bracket supporting the head is pivoted. The rotation of the cam, through the roll and cam arm oscillates the bracket, and at the proper time swings the gathering head shaft from the position shown in Fig. 2 upwardly to the position indicated by the dotted line 18 on the same figure, and back again. This causes the gathering head to periodically change from the inclination shown in Fig. 3, where its longitudinal axis is but slightly inclined, to the inclination shown in Fig. 4, where its axis is more nearly vertical.

On the cam shaft 15 is a gear 19 that is engaged by a pinion 20 on the shaft 9 upon which the head carrying bracket is pivoted. The shaft 9 is shown as having at one end a pulley 21 by means of which it may be rotated and toward the other end a bevel gear 22 which meshes with a bevel gear 23 on the end of a shaft 24 supported by the bracket. The shaft 24 has a pinion 25 meshing with a gear 26 which is attached to the shaft 6 that carries the gathering head. By means of this gearing the head is rotated as it is tilted from one position to the other. The ratios of the several pinions and gears may be adapted, and altered as necessary to obtain the desired relative rates of speed of the parts, that is, the relation of the rotation of the head to the oscillation of the head shaft and tilting of the head. The gears 25 and 26 are shown to be fastened by nuts, to facilitate removal and change.

The head and shaft carrying the head are tubular, so that air or cooling fluid may be circulated through them from the tube 27 which leads from any convenient source of supply and has any convenient swiveling connection with the tubular shaft 6.

Means are provided for severing the suspended gathers. On the cam shaft is a cam 28 engaging with which is a roll 29 on the end of a cam arm 30 that is secured to a rocker shaft 31 which carries a shear arm 32. Pivoted on the outer end of this arm is a pair of shear blades 33. The shanks 34 of these shear blades extend toward each other and are engaged by a spring 35 to hold the cutting edges of the blades yieldingly open. As the cam rotates and through the cam arm swings the shear arm 32, the shear blades are swung inwardly beneath the gathering head, and as the cutting edges of the blades reach the locality of the head their shanks engage a stop pin 36 which causes the shear blades to close together and sever the mass of glass that is hanging down from the head. Below the head is a trough 37 upon which the severed masses of glass drop and which conducts the glass away, as, for instance, to a mold 38 mounted on a mold table 39.

As illustrated in Fig. 2, operating mechanisms and the discharge trough may be mounted upon a platform 40 supported by wheels 41 so that the mechanism may easily be rolled to and away from the furnace, as desired. Extending forwardly from the furnace above the discharge outlet and forehearth is an inclosing hood 42 which is intended to prevent rapid radiation of the heat and thus keep the molten glass from chilling. The glass may be further kept warm by a gas flame projected from a gas burner 43 through an orifice 44 in the hood. The front wall of the hood is slotted or recessed as shown in Figs. 1 and 2, to clear the gathering head and to allow of its tilting movements.

With this apparatus the molten glass flows down from the discharge end of the fore-hearth on to the enlarged part of the gathering head, which is rotating at the desired speed so as to collect and accumulate the required amount of the glass into a mass. At the proper time, the head with the glass thus gathered, is tipped or turned on its transverse axis so as to allow the glass to sag down and form in a drop-like mass from approximately the tip of the head, as shown in Figs. 4 and 5. As the head turns on its transverse axis the gathered glass tends to separate from the overcoming stream, and forms into drop-like gathers which are severed by the shears at the proper time, while the flowing stream of glass is collected at approximately the neck, between the head and stem of the head, as illustrated in Figs. 4 and 5. As a result of this, at exact predetermined periods, uniform masses of molten glass are collected, gathered and severed for such further forming as may be desired.

The bearings 7 are preferably made with a removable cap to facilitate removal and replacement of the gathering head.

The axis of the shaft 9, upon which the head carrying bracket 8 is pivotally mounted is preferably disposed so as to pass approximately through the center of the gathering head 5, so that the latter, as it swings upwardly to shed a gather, remains in the pathway of the stream of glass flowing from the supply. But this, like the other features of the invention is subject to modification to adapt it to different situations or conditions of service.

I claim as my invention:—

1. The combination, with a container for molten glass having a discharge outlet, of a rotatable gathering head under the discharge outlet, mechanism for rotating said head, and mechanism for tilting said head on an axis transverse to its axis of rotation.

2. The combination, with a container for molten glass having a discharge outlet, of a gathering head under the discharge outlet, means for supporting the head for rotation, and mechanism for oscillating said support and causing the head to tilt to different axial positions under said discharge outlet.

3. The combination, with a container for molten glass having a discharge outlet, of a gathering head disposed in the line of flow from the outlet, means for supporting the head, mechanism for oscillating said support and causing the head to tilt back and forth in its position in said line of flow, and mechanism carried by said support for rotating the head.

4. The combination, with a container for molten glass having a discharge outlet, of a pivoted bracket, mechanism for oscillating the bracket, a shaft carried by the bracket, and a gathering head attached to said shaft and adapted to be tilted back and forth substantially in the line of flow from said discharge outlet.

5. The combination, with a container for molten glass having a discharge outlet, of a bracket mounted to swing upon an axis substantially intersecting the flow of glass from the outlet, mechanism for oscillating the bracket, a rotatable gathering head carried by the bracket, and located substantially at the said intersection, and mechanism carried by said bracket for rotating said shaft and head.

6. Mechanism for gathering of molten glass, comprising a head, means supporting the head, mechanism for oscillating said supporting means, and mechanism carried by said supporting means for rotating said head.

7. The combination with a container for molten glass having a discharge outlet, of supporting means beneath the outlet adapted to suspend discharged masses of the glass, and means for periodically tilting said supporting means to time the formation of successive suspended masses.

8. The method of separating molten glass into mold charges which consists in flowing the glass onto a support, periodically tilting the support to form successive gathers of the glass suspended from the support, and severing a mold charge from each gather.

9. The method of gathering glass, which consists in flowing the glass, winding the glass continuously upon itself as it flows, and periodically tilting the wound accumulations to segregate each in succession from its succeeding gather, and simultaneously beginning to wind that succeeding gather.

10. The method of gathering molten glass and severing the gathers, which consists in flowing the glass, winding the glass continuously upon itself as it flows, periodically tilting the wound accumulations to segregate each in succession from its succeeding gather and simultaneously beginning to wind the succeeding gather, and finally severing the segregated gather.

Signed at Hartford, Conn., this 29th day of December, 1916.

KARL E. PEILER.